(12) United States Patent
Sakaguchi et al.

(10) Patent No.: US 11,852,379 B2
(45) Date of Patent: Dec. 26, 2023

(54) WATER HEATING SYSTEM

(71) Applicant: DAIKIN INDUSTRIES, LTD., Osaka (JP)

(72) Inventors: Hideho Sakaguchi, Osaka (JP); Masanori Ukibune, Osaka (JP); Atsushi Okamoto, Osaka (JP); Yasuhiro Kouno, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/957,043

(22) Filed: Sep. 30, 2022

(65) Prior Publication Data
US 2023/0028896 A1 Jan. 26, 2023

Related U.S. Application Data

(63) Continuation of application No. PCT/JP2021/013653, filed on Mar. 30, 2021.

(30) Foreign Application Priority Data

Mar. 31, 2020 (JP) ................. 2020-062741

(51) Int. Cl.
*F24H 4/02* (2022.01)
*F25B 41/40* (2021.01)
*F25B 13/00* (2006.01)

(52) U.S. Cl.
CPC ............... *F24H 4/02* (2013.01); *F25B 13/00* (2013.01); *F25B 41/40* (2021.01)

(58) Field of Classification Search
CPC . F24H 4/02; F25B 13/00; F25B 41/40; Y02B 30/12
See application file for complete search history.

(56) References Cited

U.S. PATENT DOCUMENTS

2012/0042678 A1 2/2012 Park et al.
2012/0204596 A1* 8/2012 Takenaka ............. F25B 6/04
62/510

(Continued)

FOREIGN PATENT DOCUMENTS

EP 2824398 A1 1/2015
EP 3220074 A1 9/2017

(Continued)

OTHER PUBLICATIONS

Notice of Reasons for Refusal issued in corresponding Japanese Application No. 2020-062741 dated May 18, 2021 (13 pages).

(Continued)

*Primary Examiner* — Henry T Crenshaw
(74) *Attorney, Agent, or Firm* — Osha Bergman Watanabe & Burton LLP

(57) ABSTRACT

A water heating system includes: a refrigerant circuit that includes a compressor and in which a refrigerant flows; and a water circuit in which water flows. The refrigerant circuit shares with the water circuit a water heat exchanger that heats the water using the refrigerant discharged from the compressor. The water heat exchanger includes a first heat-exchanging unit in which the refrigerant exchanges heat with the water at a water outlet portion. The refrigerant circuit further includes a heat radiator that is disposed between the compressor and the first heat-exchanging unit and that radiates heat of the refrigerant discharged from the compressor. The heat radiator is configured to radiate heat of the refrigerant to water that flows on an upstream side of the water outlet portion.

7 Claims, 8 Drawing Sheets

(56) References Cited

U.S. PATENT DOCUMENTS

| | | | | |
|---|---|---|---|---|
| 2016/0146542 A1* | 5/2016 | Veilleux, Jr. | ............ | F28D 7/106 |
| | | | | 165/157 |
| 2019/0316810 A1* | 10/2019 | Xia | ........................ | F25B 30/02 |

FOREIGN PATENT DOCUMENTS

| | | | |
|---|---|---|---|
| JP | S58-183436 U | | 12/1983 |
| JP | S62-218769 A | | 9/1987 |
| JP | 2004-232963 A | | 8/2004 |
| JP | 2004232963 A | * | 8/2004 |
| JP | 2011-117643 A | | 6/2011 |
| JP | 2015-17761 A | | 1/2015 |
| JP | 2015-172473 A | | 10/2015 |
| WO | 2013055088 A1 | | 4/2013 |

OTHER PUBLICATIONS

Decision to Grant a Patent issued in corresponding Japanese Application No. 2020-062741 dated Oct. 12, 2021 (5 pages).

International Search Report issued in corresponding International Application No. PCT/JP2021/013653 dated May 18, 2021 (3 pages).

International Preliminary Report on Patentability issued in corresponding International Application No. PCT/JP2021/013653 dated Oct. 13, 2022 (6 pages).

Extended European Search Report issued in corresponding European Patent Application No. 21780587.8, dated Aug. 9, 2023 (9 pages).

* cited by examiner

WATER HEATING SYSTEM

CROSS-REFERENCE TO RELATED APPLICATIONS

This is a continuation application of International Patent Application No. PCT/JP2021/013653, filed on Mar. 30, 2021, and claims priority to Japanese Patent Application No. 2020-062741, filed on Mar. 31, 2020. The contents of these priority applications are incorporated herein by reference.

TECHNICAL FIELD

The present disclosure relates to a water heating system.

BACKGROUND

In the related art, a water heating system including a water heat exchanger that heats water by using a refrigerant is known. In the water heating system, scale may adhere due to water being heated at the water heat exchanger. An example of a technique based on the assumption that scale adheres to a water heat exchanger is a heat pump hot water supply system disclosed in Patent Literature 1 (Japanese Unexamined Patent Application Publication No. 2015-17761).

In the heat pump hot water supply system disclosed in Patent Literature 1, a water heat exchanger is divided into a high-temperature-side water heat exchanger and a low-temperature-side water heat exchanger, a hot water output temperature sensor is provided on a hot water outlet side of the high-temperature-side water heat exchanger, and a hot water temperature sensor is provided on an outlet side of the low-temperature-side water heat exchanger. In addition, the heat pump hot water supply system includes a control unit that, when a value detected by the outlet hot water temperature sensor of the low-temperature-side water heat exchanger exceeds a set value at the time of a reduction in performance caused by scale adhesion to the high-temperature-side water heat exchanger, performs suppression control on the hot water outlet temperature to be less than or equal to a set value, and outputs reduction information about the hot water output temperature and maintenance information about the high-temperature-side water heat exchanger.

SUMMARY

A water heating system according to one or more embodiments includes a refrigerant circuit and a water circuit. The refrigerant circuit has a compressor, and a refrigerant flows in the refrigerant circuit. Water flows in the water circuit. The refrigerant circuit and the water circuit share a water heat exchanger that heats water by using the refrigerant discharged from the compressor. The water heat exchanger includes a first heat-exchanging unit. In the first heat-exchanging unit, the refrigerant and water at a water outlet portion exchange heat with each other. The refrigerant circuit further has a heat radiator. The heat radiator is disposed between the compressor and the first heat-exchanging unit, and radiates heat of the refrigerant discharged from the compressor.

DETAILED DESCRIPTION

A water heating system according to one or more embodiments of the present disclosure is described with reference to the drawings.

(1) First Embodiments (1-1) Overall Structure

A water heating system 1 according to one or more embodiments of the present disclosure heats water by using a refrigerant. The water heating system 1 of one or more embodiments is a hot water supply system.

Figure 1:
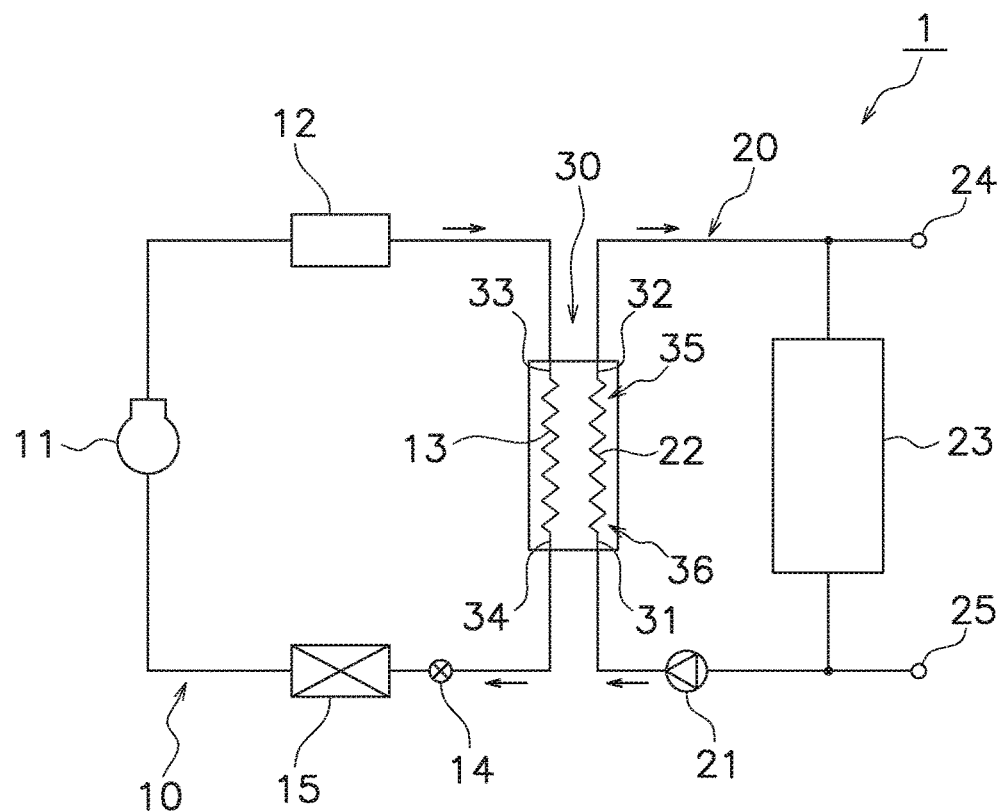
FIG. 1 is a schematic structural view of a water heating system according to first embodiments.

As shown in FIG. 1, the water heating system 1 includes a refrigerant circuit 10 and a water circuit 20. The refrigerant circuit 10 and the water circuit 20 share a water heat exchanger 30 that heats water by using the refrigerant.

(1-2) Detailed Structure (1-2-1) Refrigerant Circuit

A refrigerant flows in the refrigerant circuit 10. As the refrigerant, for example, a fluid containing R32 is sealed in the refrigerant circuit 10.

The refrigerant circuit 10 includes a compressor 11, a heat radiator 12, a condenser 13, an expansion valve 14, and an evaporator 15. In the refrigerant circuit 10, the compressor 11, the heat radiator 12, the condenser 13, the expansion valve 14, and the evaporator 15 are sequentially connected to each other by a refrigerant pipe.

The compressor 11 is device that compresses a low-pressure refrigerant into a high-pressure refrigerant. The compressor 11 of one or more embodiments is a compressor of a type that is capable of controlling the number of rotations by an inverter circuit and adjusting the discharge amount of the refrigerant.

The heat radiator 12 radiates heat of the refrigerant discharged from the compressor 11. Therefore, the temperature of the refrigerant that has passed through the heat radiator 12 is reduced. The heat radiator 12 is disposed between a first heat-exchanging unit 35 of the water heat exchanger 30 (described below) and the compressor 11.

The heat radiator 12 exchanges heat with a heat medium that differs from water in the water circuit 20. The heat radiator 12 of one or more embodiments includes at least one of a heat storage material that radiates heat of the refrigerant and a heat-radiating device that radiates heat of the refrigerant to the atmosphere. In the heat radiator 12, the heat of the refrigerant is radiated to at least one of the heat storage material and the atmosphere.

The condenser 13 is a condenser that condenses and liquefies the refrigerant that flows in the refrigerant circuit 10 by heat exchange. In one or more embodiments, the condenser 13 includes, for example, a heat transfer tube through which, in the water heat exchanger 30, the refrigerant that flows in the refrigerant circuit 10 passes. In the water heat exchanger 30, heat is exchanged between the refrigerant that flows in the condenser 13 and water that flows in the water circuit 20.

The expansion valve 14 is a valve that decompresses and expands the refrigerant that flows in the refrigerant circuit 10, and is, for example, an electronic expansion valve.

The evaporator 15 is an evaporator that evaporates the refrigerant that flows in the refrigerant circuit 10 by heat exchange. The evaporator 15 of one or more embodiments is an outdoor unit where heat is exchanged between outside air and the refrigerant.

(1-2-2) Water Circuit

Water flows in the water circuit 20. The water circuit 20 includes a circulation pump 21, a heat absorber 22, and a hot water storage tank 23. In the water circuit, the circulation pump 21, the heat absorber 22, and the hot water storage tank 23 are sequentially connected to each other by a water pipe.

The water circuit 20 is a hot-water-supply hot water circuit that produces hot water from water. In the water circuit 20, water or hot water circulates so that hot water heated at the heat absorber 22 of the water heat exchanger 30 is stored in the hot water storage tank 23.

The circulation pump 21 circulates water. The heat absorber 22 heats water that flows in the water circuit 20 by heat exchange. In one or more embodiments, the heat absorber 22 includes, for example, a heat transfer tube through which, in the water heat exchanger 30, water that flows in the water circuit 20 passes. In the water heat exchanger 30, heat is exchanged between water that flows in the heat absorber 22 and the refrigerant that flows in the refrigerant circuit 10. The hot water storage tank 23 stores hot water heated at the heat absorber 22.

In order to supply and discharge water in the hot water storage tank 23, a water supply pipe 24 to the hot water storage tank 23 and a hot water discharge pipe 25 from the hot water storage tank 23 are connected to the water circuit 20.

Note that the water circuit 20 may further include a scale trap for trapping scale.

(1-2-3) Water Heat Exchanger

In the water heat exchanger 30, the heat radiator 12 of the refrigerant circuit 10 and the heat absorber 22 of the water circuit 20 are integrally formed. In the water heat exchanger 30, heat is exchanged between the refrigerant that flows in the heat radiator 12 and water that flows in the heat absorber 22.

The water heat exchanger 30 includes a water inlet portion 31 and a water outlet portion 32 in the water circuit 20. The water inlet portion 31 is a portion near an inlet of the water circuit 20 in the water heat exchanger 30. The water outlet portion 32 is a portion near an outlet of the water circuit 20 in the water heat exchanger 30.

The water heat exchanger 30 includes a refrigerant inlet portion 33 and a refrigerant outlet portion 34 in the refrigerant circuit 10. The refrigerant inlet portion 33 is a portion near an inlet of the refrigerant circuit 10 in the water heat exchanger 30. The refrigerant outlet portion 34 is a portion near an outlet of the refrigerant circuit 10 in the water heat exchanger 30.

In the water heat exchanger 30, a water flow direction and a refrigerant flow direction are in a counter-flow relationship. In FIG. 1, in the water heat exchanger 30, the refrigerant flow direction is a downward direction and the water flow direction is an upward direction.

The water heat exchanger 30 includes the first heat-exchanging unit 35 and a second heat-exchanging unit 36. In FIG. 1, an upper side of the water heat exchanger 30 is the first heat-exchanging unit 35, and a lower side of the water heat exchanger 30 is the second heat-exchanging unit 36.

In the first heat-exchanging unit 35, the refrigerant and water at the water outlet portion 32 exchange heat with each other. The first heat-exchanging unit 35 exchanges heat with the refrigerant on a downstream side of the water circuit 20 in the water heat exchanger 30. Here, in the first heat-exchanging unit 35, water at the water outlet portion 32 and the refrigerant at the refrigerant inlet portion 33 exchange heat with each other.

The second heat-exchanging unit 36 exchanges heat with the refrigerant on an upstream side of the first heat-exchanging unit 35 in the water circuit 20. In the second heat-exchanging unit 36, the refrigerant and water at the water inlet portion 31 exchange heat with each other. Here, in the second heat-exchanging unit 36, water at the water inlet portion 31 and the refrigerant at the refrigerant outlet portion 34 exchange heat with each other.

As the water heat exchanger 30, for example, a double-pipe-type heat exchanger or a plate-type heat exchanger can be used. The double-pipe-type heat exchanger is a heat exchanger including an inner pipe in which a refrigerant flow path or a water flow path is formed inside, and an outer pipe that is provided on an outer side of the inner pipe and in which a water flow path or the refrigerant flow path is formed between the outer pipe and the inner pipe. The plate-type heat exchanger is a heat exchanger in which water flow paths or fluid flow paths are alternately formed between a plurality of stacked plates.

(1-3) Operation of Water Heating System

Next, an operation of the water heating system 1 is described.

In the refrigerant circuit 10, the refrigerant discharged from the compressor 11 flows into the heat radiator 12. The heat radiator 12 radiates heat of the refrigerant discharged from the compressor 11. The refrigerant whose temperature has been reduced due to the heat being radiated at the heat radiator 12 flows into the water heat exchanger 30. At the condenser 13 of the water heat exchanger 30, heat is radiated from water, and the refrigerant is condensed. After the refrigerant condensed at the condenser 13 has expanded at the expansion valve 14, the refrigerant flows into the evaporator 15. The refrigerant absorbs heat from outside air and evaporates at the evaporator 15. In the refrigerant circuit 10, the refrigerant circulates in this way, and a compression stroke, a condensation stroke, an expansion stroke, and an evaporation stroke are repeated. Between the compression stroke and the condensation stroke, the refrigerant radiates heat at the heat radiator 12.

In the water circuit 20, water of the hot water storage tank 23 is supplied to the heat absorber 22 of the water heat exchanger 30 by the circulation pump 21, and absorbs heat from the refrigerant and is thus heated. Hot water produced by heating returns to the hot water storage tank 23, and circulation of the hot water in the water circuit 20 is continued until the heat storage temperature reaches a predetermined heat storage temperature.

In this way, after the refrigerant compressed to a high temperature at the compressor 11 has exchanged heat with a heat medium, other than water, that is heated at the heat radiator 12, the refrigerant exchanges heat with water at the water outlet portion 32 of the water heat exchanger 30.

(1-4) Features

The water heating system 1 of one or more embodiments includes a refrigerant circuit 10 and a water circuit 20. The refrigerant circuit 10 has a compressor 11, and a refrigerant flows therein. Water flows in the water circuit 20. The refrigerant circuit 10 and the water circuit 20 share the water heat exchanger 30 that heats water by using the refrigerant discharged from the compressor 11. The water heat exchanger 30 includes a first heat-exchanging unit 35. In the first heat-exchanging unit 35, the refrigerant and water at the water outlet portion 32 exchange heat with each other. The refrigerant circuit 10 further has a heat radiator 12. The heat radiator 12 is disposed between the compressor 11 and the first heat-exchanging unit 35, and radiates heat of the refrigerant discharged from the compressor 11.

In the water heating system 1 of one or more embodiments, the first heat-exchanging unit 35 at which water at the water outlet portion 32 and the refrigerant exchange heat with each other is a portion at which water has the highest temperature in the water circuit 20 at the water heat exchanger 30. Here, the heat radiator 12 that radiates heat of the refrigerant is disposed between the compressor 11 and the first heat-exchanging unit 35. Since the heat radiator 12 radiates heat before the refrigerant flows into the first heat-exchanging unit 35, the temperature of the refrigerant that flows into the first heat-exchanging unit 35 can be reduced. Therefore, in the first heat-exchanging unit 35, it is possible to suppress an increase in the temperature of water at the water outlet portion 32. Therefore, it is possible to suppress an increase in the temperature of a surface of the water outlet portion 32 of the first heat-exchanging unit 35. Therefore, it is possible to prevent scale from adhering to the water heat exchanger 30.

In this way, in the water heating system of one or more embodiments, since it is possible to prevent scale from adhering to the water heat exchanger 30, it is possible to reduce the frequency of cleaning or exchanging the water heat exchanger 30.

In the water heating system 1, the heat radiator 12 may include a heat storage material that radiates heat of the refrigerant. In this case, it is possible to prevent scale from adhering to the water heat exchanger 30 and to store the heat of the refrigerant in the heat storage material.

The water heating system 1 may include a heat-radiating device that radiates heat of the refrigerant to the atmosphere. In this case, it is possible to prevent scale from adhering to the water heat exchanger 30 and to radiate the heat of the refrigerant to the atmosphere.

Here, in at least a part of the water heat exchanger 30, the water flow direction and the refrigerant flow direction are in a counter-flow relationship. By causing the refrigerant and water to flow in a counter-flow relationship, it is possible to improve heat exchange efficiency.

(1-5) Modification of First Embodiments

Although the heat radiator 12 of the first embodiments above includes at least one of a heat storage material and a heat-radiating device, the heat radiator 12 is not limited as long as it exchanges heat with a heat medium that differs from water in the water circuit 20. In the present modification, the refrigerant circuit 10 has a plurality of outdoor units, at least one outdoor unit is used as an evaporator, and the other outdoor unit is used as the heat radiator 12.

(2) Second Embodiments (2-1) Overall Structure

Figure 2:
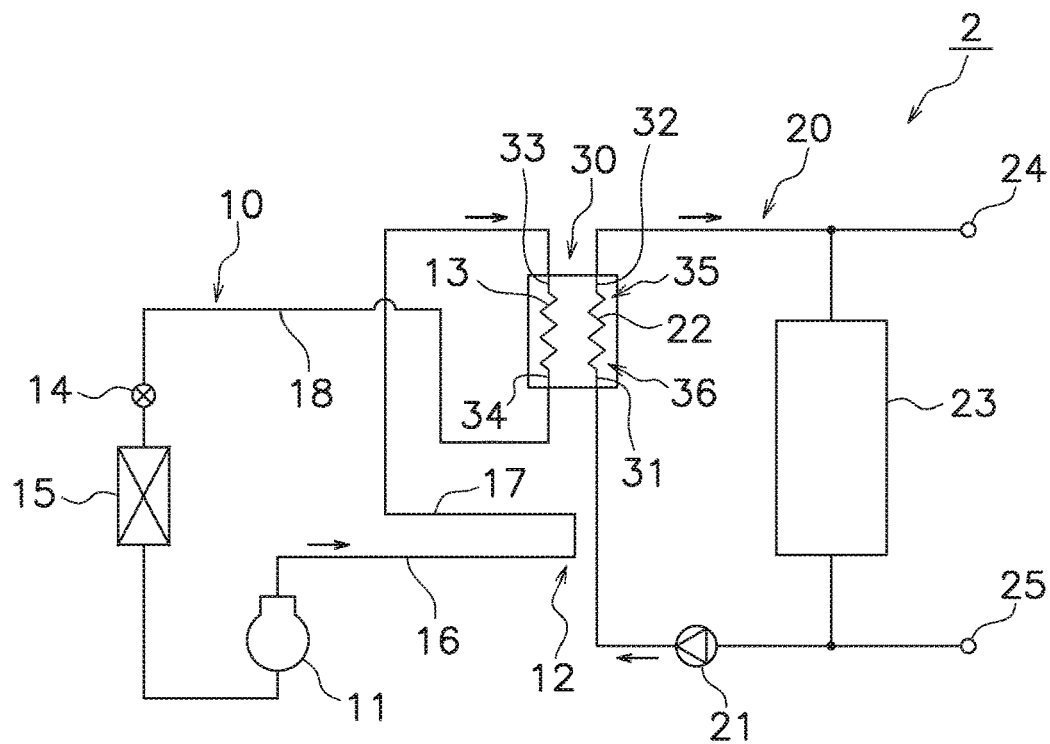
FIG. 2 is a schematic structural view of a water heating system according to second embodiments.

A water heating system 2 of second embodiments shown in FIG. 2 is basically the same as the water heating system 1 of the first embodiments, but differs primarily in a heat radiator 12. Although the heat radiator 12 of the first embodiments exchanges heat with a heat medium that differs from water in the water circuit 20, the heat radiator 12 of the second embodiments exchanges heat with water in a water circuit 20. As shown in FIG. 2, in the water heating system 2 of one or more embodiments, the heat radiator 12 is configured to radiate heat of a refrigerant to water that flows on an upstream side of a water outlet portion 32.

(2-2) Detailed Structure

In the heat radiator 12, a heat medium with which the refrigerant discharged from a compressor 11 exchanges heat is water that is heated in a water heat exchanger 30. Specifically, in a refrigerant pipe in which the refrigerant discharged from the compressor 11 flows, the heat radiator 12 is disposed on a portion close to a water pipe on an upstream side of the water heat exchanger 30. Here, a refrigerant circuit 10 has a first refrigerant pipe 16 that connects the compressor 11 and the heat radiator 12 to each other and a second refrigerant pipe 17 that connects the heat radiator 12 and a refrigerant inlet portion 33 to each other.

Since the water circuit 20 and the water heat exchanger 30 are the same as those of the first embodiments, the description thereof is not repeated.

(2-3) Operation of Water Heating System

In the refrigerant circuit 10, the refrigerant discharged from the compressor 11 flows into the heat radiator 12 via the first refrigerant pipe 16. The heat radiator 12 radiates heat of the refrigerant discharged from the compressor 11 to water in the water circuit 20. The refrigerant whose temperature has been reduced due to the heat being radiated at the heat radiator 12 flows into the water heat exchanger 30 via the second refrigerant pipe 17. At a condenser 13 of the water heat exchanger 30, heat is radiated from water, and the refrigerant is condensed. After the refrigerant condensed at the condenser 13 has expanded at an expansion valve 14, the refrigerant flows into an evaporator 15. At the evaporator 15, heat is absorbed from outside air, and the refrigerant is evaporated. In the refrigerant circuit 10, the refrigerant circulates in this way, and a compression stroke, a condensation stroke, an expansion stroke, and an evaporation stroke are repeated.

In the water circuit 20, water of a hot water storage tank 23, before being supplied to a heat absorber 22 of the water heat exchanger 30 by a circulation pump 21, absorbs heat from the refrigerant that flows in the heat radiator 12 and is heated. The water that has been heated by the heat radiator 12 flows into the water heat exchanger 30 and further absorbs heat from the refrigerant at the heat absorber 22, as a result of which the water is heated. Hot water produced by the heating returns to the hot water storage tank 23.

In this way, after the refrigerant compressed to a high temperature at the compressor 11 has exchanged heat with water that flows on the upstream side of the water outlet portion 32, the refrigerant exchanges heat with water at the water outlet portion 32 of the water heat exchanger 30.

(2-4) Features

The water heating system 2 of one or more embodiments is configured to radiate heat of the refrigerant to water that flows on the upstream side of the water outlet portion 32.

In the water circuit 20 of the water heating system 2, the temperature of water that flows on the upstream side of the water outlet portion 32 is lower than the temperature of water that flows in the water outlet portion 32. Here, the heat radiator 12 is capable of heating the low-temperature water on the upstream side by the refrigerant before the water is heated at the first heat-exchanging unit 35. Therefore, it is possible to prevent scale from adhering to the water heat exchanger 30 and to efficiently heat water.

(3) Third Embodiments (3-1) Overall Structure

Figure 3:
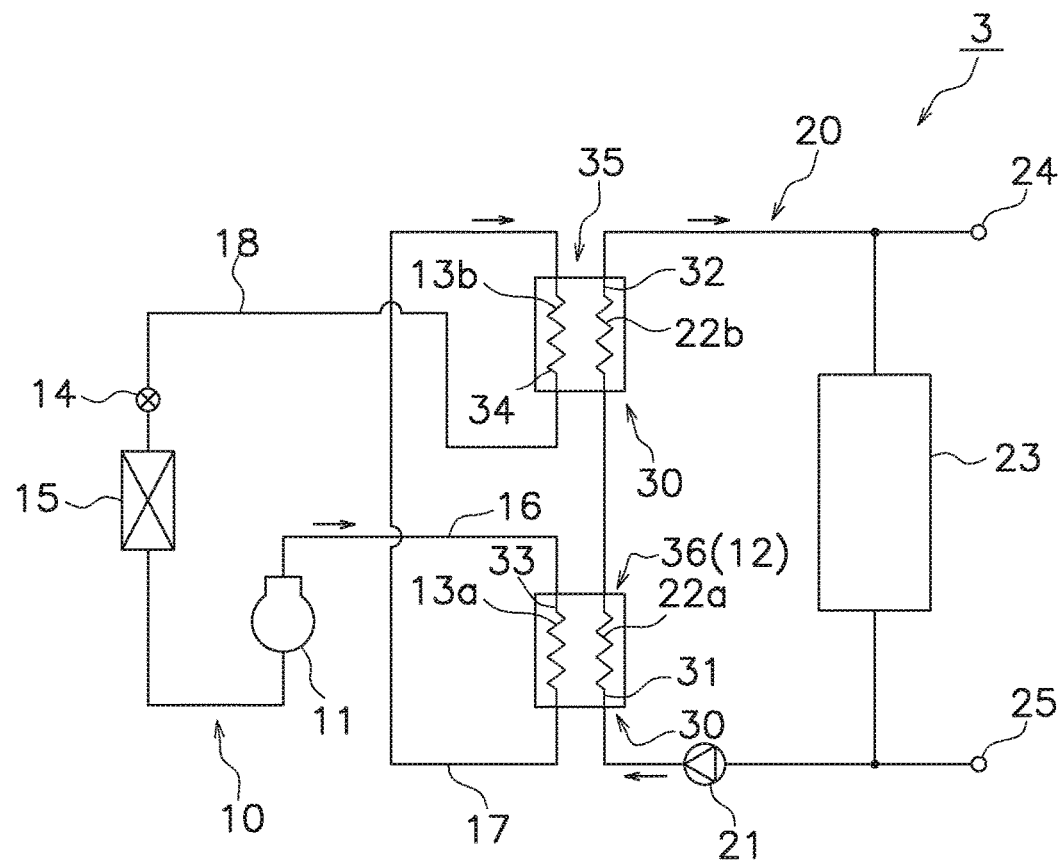
FIG. 3 is a schematic structural view of a water heating system according to third embodiments.

A water heating system 3 of third embodiments shown in FIG. 3 is basically the same as the water heating system 2 of the second embodiments, but differs primarily in a water heat exchanger 30 and a heat radiator 12. Although the first heat-exchanging unit 35 and the second heat-exchanging unit 36 are disposed at one water heat exchanger 30 in the second embodiments, they are disposed at different water heat exchangers in the third embodiments. As shown in FIG. 3, the water heating system 3 of one or more embodiments includes a water heat exchanger constituted by a first heat-exchanging unit 35 and a water heat exchanger constituted by a second heat-exchanging unit 36. The heat radiator 12 includes the second heat-exchanging unit 36.

(3-2) Detailed Structure (3-2-1) Refrigerant Circuit

A refrigerant circuit 10 includes a compressor 11, a first condenser 13a, a second condenser 13b, an expansion valve 14, and an evaporator 15. In the refrigerant circuit 10, the compressor 11, the first condenser 13a, the second condenser 13b, the expansion valve 14, and the evaporator 15 are sequentially connected to each other by a refrigerant pipe. A first refrigerant pipe 16 connects the compressor 11 and the first condenser 13a to each other. A second refrigerant pipe 17 connects the first condenser 13a and the second condenser 13b to each other. A third refrigerant pipe 18 connects the second condenser 13b and the evaporator 15 to each other.

The first condenser 13a is disposed at the second heat-exchanging unit 36 of a water heat exchanger 30. At the first condenser 13a, in the second heat-exchanging unit 36, heat is exchanged between a refrigerant that flows in the first condenser 13a and water that flows in a water circuit 20.

The second condenser 13b is connected in series with the first condenser 13a. The second condenser 13b is disposed at the first heat-exchanging unit 35 of the water heat exchanger 30. At the second condenser 13b, in the first heat-exchanging unit 35, heat is exchanged between a refrigerant that flows in the second condenser 13b and water that flows in the water circuit 20.

The heat radiator 12 of one or more embodiments is the second heat-exchanging unit 36 in the refrigerant circuit 10. Therefore, the heat radiator 12 radiates the heat of the refrigerant to water that flows in the second heat-exchanging unit 36.

(3-2-2) Water Circuit

The water circuit 20 includes a circulation pump 21, a first heat absorber 22a, a second heat absorber 22b, and a hot water storage tank 23. In the water circuit 20, the circulation pump 21, the first heat absorber 22a, the second heat absorber 22b, and the hot water storage tank 23 are sequentially connected to each other by a water pipe.

The first heat absorber 22a is disposed at the second heat-exchanging unit 36 of the water heat exchanger 30. At the first heat absorber 22a, in the second heat-exchanging unit 36, heat is exchanged with the refrigerant that flows in the first condenser 13a.

The second heat absorber 22b is connected in series with the first heat absorber 22a. The second heat absorber 22b is disposed at the first heat-exchanging unit 35 of the water heat exchanger 30. At the second heat absorber 22b, in the first heat-exchanging unit 35 of the water heat exchanger 30, heat is exchanged between water that flows in the second heat absorber 22b and water that flows in the refrigerant circuit 10.

(3-2-3) Water Heat Exchanger

The water heat exchanger 30 is divided into a water heat exchanger including the first heat-exchanging unit 35 and a water heat exchanger including the second heat-exchanging unit 36. The first heat-exchanging unit 35 has a water outlet portion 32 and a refrigerant outlet portion 34. The water outlet portion 32 corresponds to the second heat absorber 22b, and the refrigerant outlet portion 34 corresponds to the second condenser 13b. The second heat-exchanging unit 36 has a water inlet portion 31 and a refrigerant inlet portion 33. The water inlet portion 31 corresponds to the first heat absorber 22a, and the refrigerant inlet portion 33 corresponds to the first condenser 13a.

In the first heat-exchanging unit 35, a water flow direction and a refrigerant flow direction are in a counter-flow relationship. In the second heat-exchanging unit 36, a water flow direction and a refrigerant flow direction are in a counter-flow relationship. In FIG. 3, the refrigerant flow direction in the first heat-exchanging unit 35 and the refrigerant flow direction in the second heat-exchanging unit 36 are the same. In FIG. 3, the water flow direction in the first heat-exchanging unit 35 and the water flow direction in the second heat-exchanging unit 36 are the same.

Here, the water heat exchanger 30 is constituted by two heat exchangers. In the present description, in the water heat exchanger 30 that is constituted by one or a plurality of heat exchangers, the water outlet portion 32 is an outlet vicinity portion including an outlet that is positioned on a most downstream side of the water circuit 20.

(3-3) Operation of Water Heating System

In the refrigerant circuit 10, the refrigerant discharged from the compressor 11 flows into the second heat-exchanging unit 36, serving as the heat radiator 12, via the first refrigerant pipe 16. At the second heat-exchanging unit 36, in the first condenser 13a, heat of the refrigerant discharged from the compressor 11 is radiated to water in the water circuit 20. The refrigerant whose temperature has been reduced due to the heat being radiated at the heat radiator 12 flows into the first heat-exchanging unit 35 via the second refrigerant pipe 17. At the first heat-exchanging unit 35, in the second condenser 13b, heat is radiated to water in the water circuit 20 and the refrigerant is condensed. After the refrigerant condensed at the first condenser 13 and the second condenser 13 has expanded at the expansion valve 14, the refrigerants flow into the evaporator 15 via the third refrigerant pipe 18.

In the water circuit 20, water of the hot water storage tank 23 flows into the second heat-exchanging unit 36 by the circulation pump 21. At the second heat-exchanging unit 36, serving as the heat radiator 12, water of the water circuit 20 absorbs heat from the refrigerant and is heated at the first heat absorber 22a. The water that has been heated at the heat radiator 12 flows into the first heat-exchanging unit 35 and further absorbs heat from the refrigerant at the second heat absorber 22b, as a result of which the water is heated. Hot water produced by the heating returns to the hot water storage tank 23.

In this way, after the refrigerant compressed to a high temperature at the compressor 11 has exchanged heat with water at the second heat-exchanging unit 36, the refrigerant exchanges heat with water at the water outlet portion 32 of the first heat-exchanging unit 35.

(3-4) Features

The water heat exchanger 30 of the water heating system 3 of one or more embodiments further includes the second heat-exchanging unit 36 that exchanges heat with the refrigerant on an upstream side of the first heat-exchanging unit 35 in the water circuit 20. The heat radiator 12 includes the second heat-exchanging unit 36.

In the water heating system 3 of one or more embodiments, the temperature of water that flows in the second heat-exchanging unit 36 is lower than the temperature of water that flows in the first heat-exchanging unit 35. Here, the heat radiator 12 is capable of heating the low-temperature water at the second heat-exchanging unit 36 by the refrigerant before the water is heated at the first heat-exchanging unit 35. Therefore, it is possible to realize the water heating system 3 that is capable of preventing scale from adhering to the water heat exchanger 30 and that is capable of efficiently heating water.

(3-5) Modification of Third Embodiments

Figure 4:
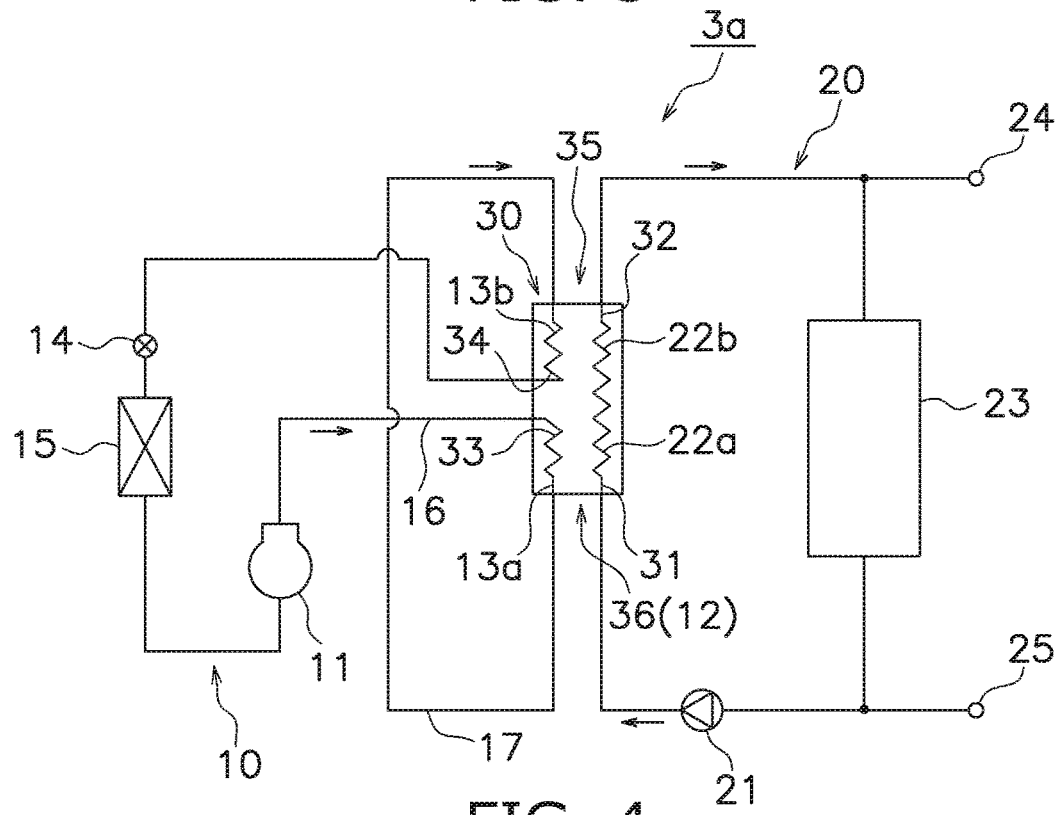
FIG. 4 is a schematic structural view of a water heating system according to a modification of the third embodiments.

Although the water heating system 3 of the above-described embodiments includes two separated water heat exchangers, a water heating system 3a of the present modification shown in FIG. 4 includes a first heat-exchanging unit 35 and a second heat-exchanging unit 36 that are separated by a refrigerant flow path of one water heat exchanger 30.

The water heat exchanger 30 includes the first heat-exchanging unit 35 and the second heat-exchanging unit 36. In the refrigerant circuit 10 inside the water heat exchanger 30, a refrigerant flow path that passes through the first heat-exchanging unit 35 and a refrigerant flow path that passes through the second heat-exchanging unit 36 are separated from each other. The second refrigerant pipe 17 of the refrigerant circuit 10 causes a refrigerant that has flowed out from the first heat-exchanging unit 35 to flow into the second heat-exchanging unit 36 of the water heat exchanger 30 that is shared with the first heat-exchanging unit 35.

Plate-type heat exchangers may be used as water heat exchangers in the water heating system 3 of the above-described embodiments in which the first heat-exchanging unit 35 and the second heat-exchanging unit 36 are separated into a plurality of water heat exchangers. On the other hand, a double-pipe-type heat exchanger may be used as a water heat exchanger in the water heating system 3a of the present modification in which one water heat exchanger is divided into the first heat-exchanging unit 35 and the second heat-exchanging unit 36 by the refrigerant flow path.

(4) Fourth Embodiments (4-1) Overall Structure

Figure 5:
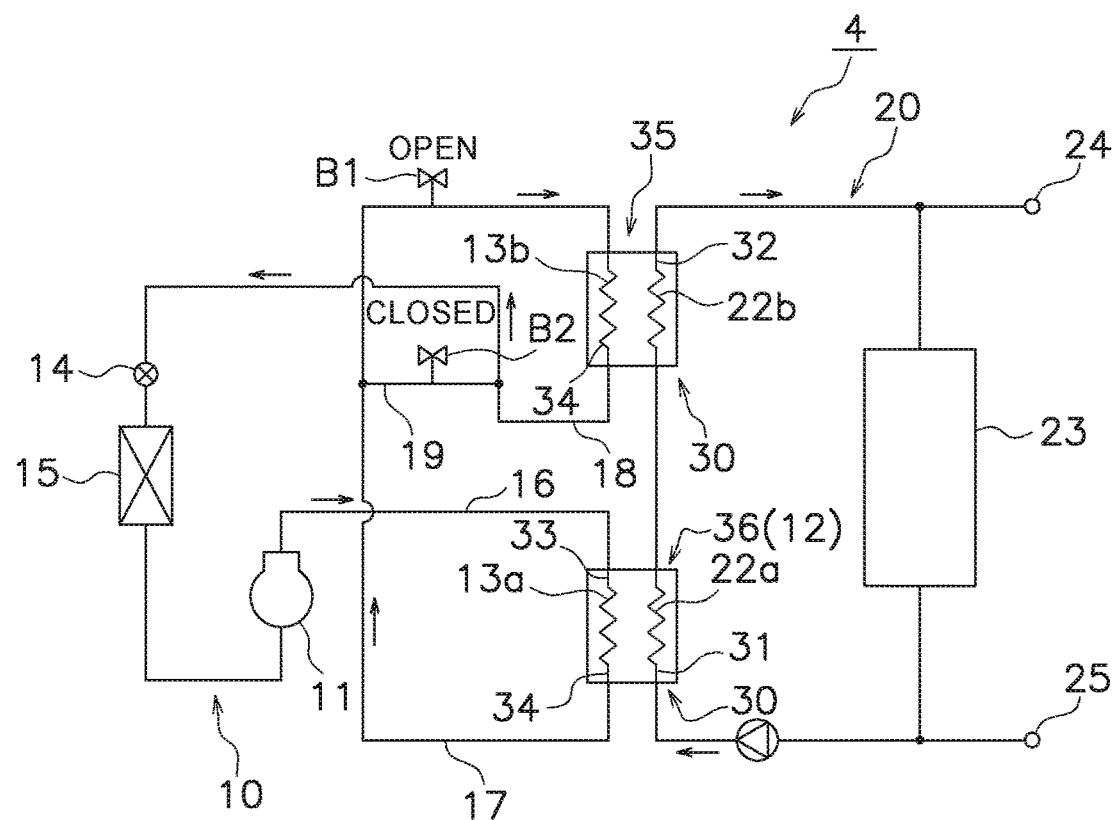
FIG. 5 is a schematic structural view of a water heating system according to fourth embodiments.
Figure 6:
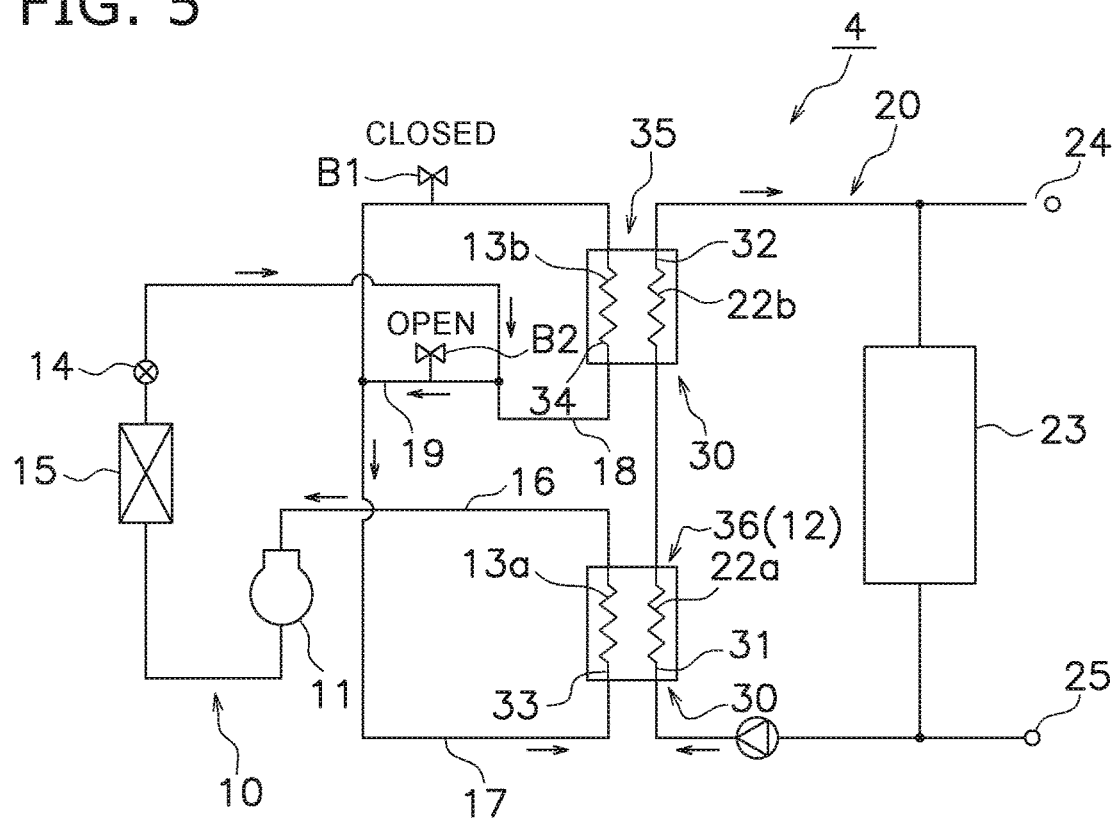
FIG. 6 is a schematic structural view of the water heating system according to the fourth embodiments.

A water heating system 4 of fourth embodiments shown in FIGS. 5 and 6 is basically the same as the water heating system 3 of the third embodiments, but differs primarily in a refrigerant circuit 10. The water heating system 4 of one or more embodiments is capable of performing a defrosting operation for defrosting. The refrigerant circuit 10 further has a bypass pipe 19 in which a refrigerant bypasses a first heat-exchanging unit 35 when a defrosting operation is performed.

(4-2) Detailed Structure

The refrigerant circuit 10 further has the bypass pipe 19, a first valve B1, and a second valve B2.

The bypass pipe 19 is connected to a second refrigerant pipe 17 that connects a first condenser 13a and a second condenser 13b to each other and to a third refrigerant pipe 18 that connects the second condenser 13b and an expansion valve 14 to each other. When a defrosting operation is performed, the refrigerant that flows in the third refrigerant pipe 18 bypasses the first heat-exchanging unit 35 and flows in the second refrigerant pipe 17 due to the bypass pipe 19.

The first valve B1 is provided at the second refrigerant pipe 17. The second valve B2 is provided at the bypass pipe 19. The first valve B1 and the second valve B2 are on-off valves.

Since a water circuit 20 and a water heat exchanger 30 are the same as those of the third embodiments, a description thereof is not repeated.

(4-3) Operation of Water Heating System (4-3-1) Heating Operation

FIG. 5 shows flows of the refrigerant and water when a heating operation of one or more embodiments is performed. A heating operation of the water heating system 4 is described with reference to FIG. 5.

At the time of the heating operation, the first valve B1 is fully open and the second valve B2 is fully closed. In the refrigerant circuit 10, the refrigerant discharged from a compressor 11 passes through a first refrigerant pipe 16 and flows into a second heat-exchanging unit 36, serving as a heat radiator 12. At the second heat-exchanging unit 36, in the first condenser 13a, heat of the refrigerant discharged from the compressor 11 is radiated to water in the water circuit 20. Since the first valve B1 is open, the refrigerant whose temperature has been reduced due to the heat being radiated at the heat radiator 12 flows through the second refrigerant pipe 17 and flows into the first heat-exchanging unit 35. At the first heat-exchanging unit 35, in the second condenser 13b, heat is radiated to water in the water circuit 20 and the refrigerant is condensed. After the refrigerant condensed at the second condenser 13 has passed through the third refrigerant pipe 18 and has expanded at the expansion valve 14, the refrigerant flows into an evaporator 15.

In the water circuit 20, water of a hot water storage tank 23 flows sequentially into the second heat-exchanging unit 36 and the first heat-exchanging unit 35 by a circulation pump 21. Water in the water circuit 20 is heated by the refrigerant at the second heat-exchanging unit 36 and the first heat-exchanging unit 35. Hot water produced by the heating returns to the hot water storage tank 23.

(4-3-2) Defrosting Operation

FIG. 6 shows flows of the refrigerant and water when a defrosting operation of one or more embodiments is performed. In FIG. 6, a water inlet portion 31, a water outlet portion 32, a refrigerant inlet portion 33, and a refrigerant outlet portion 34 are each provided with a reference sign based on a direction of flow of the refrigerant and water when a heating operation is performed (the same as in FIG. 5). A defrosting operation of the water heating system 4 is described with reference to FIG. 6.

When, at the time of the heating operation, frost formation is detected due to, for example, a reduction in the temperature of the refrigerant at the evaporator 15, a defrosting operation that dissolves the frost that has adhered to the evaporator 15 is performed.

When the defrosting operation is performed, the first valve B1 is fully closed and the second valve B2 is fully open. The refrigerant discharged from the compressor 11 flows into a heat exchanger that functions as the evaporator 15 when a heating operation is performed, radiates heat to outside air, and is condensed. Although the refrigerant passes through the third refrigerant pipe 18 after being expanded at the expansion valve 14, since the first valve B1 is closed and the second valve B2 is open, the refrigerant bypasses the first heat-exchanging unit 35 and passes through the bypass pipe 19. The refrigerant flows through the second refrigerant pipe 17 connected to the bypass pipe 19 and flows into the second heat-exchanging unit 36. The refrigerant passes through a flow path that functions as the first condenser 13a when a heating operation is performed and the first refrigerant pipe 16, and is sucked into the compressor 11.

(4-4) Features

In the water heating system 4 of one or more embodiments, the refrigerant circuit 10 further has a bypass pipe 19 in which the refrigerant bypasses the first heat-exchanging unit 35 when a defrosting operation is performed. Since, by bypassing the first heat-exchanging unit 35 when a defrosting operation is performed, it is possible to use the heat amount that has been stored at the second heat-exchanging unit 36 that contains a high-temperature refrigerant, it is possible to reduce a defrosting operation time.

(5) Fifth Embodiments (5-1) Overall Structure

Figure 7:
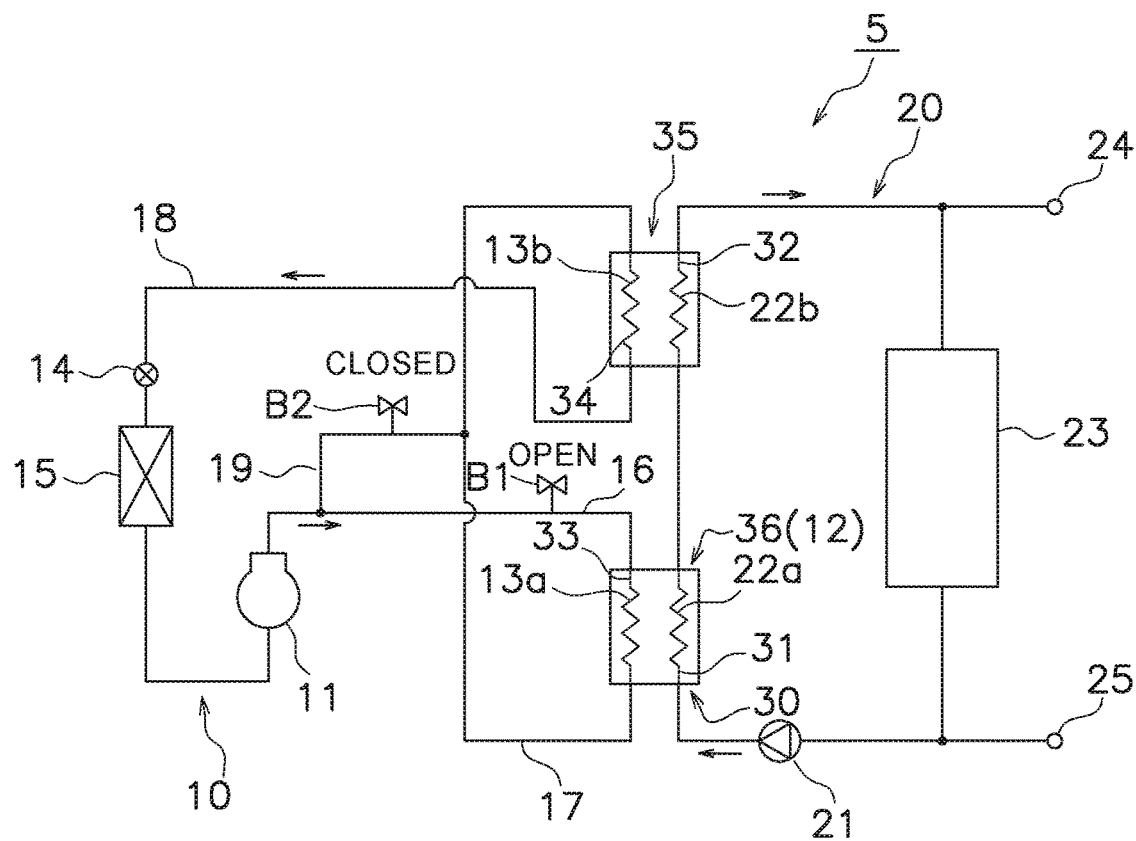
FIG. 7 is a schematic structural view of a water heating system according to fifth embodiments.
Figure 8:
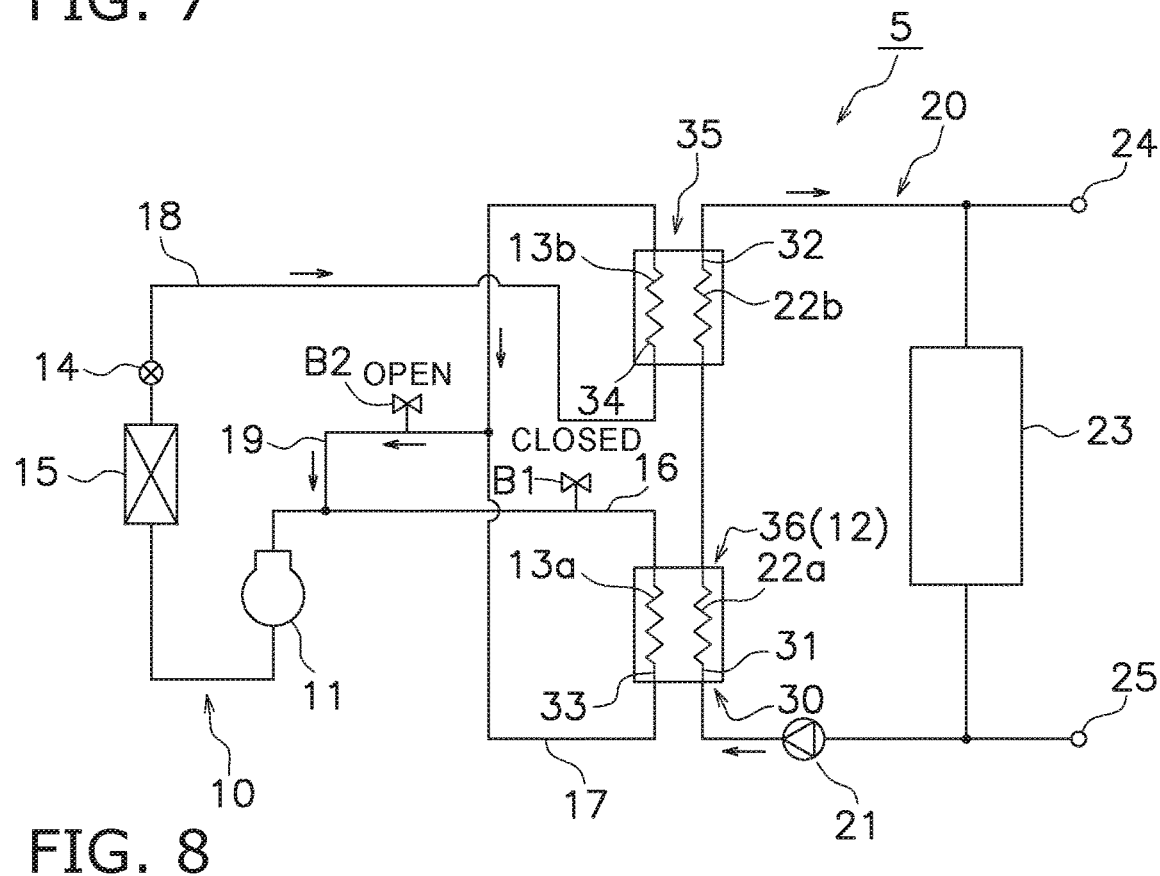
FIG. 8 is a schematic structural view of the water heating system according to the fifth embodiments.

A water heating system 5 of fifth embodiments shown in FIGS. 7 and 8 is basically the same as the water heating system 3 of the third embodiments, but differs primarily in a refrigerant circuit 10. The water heating system 5 of one or more embodiments is capable of performing a defrosting operation. The refrigerant circuit 10 further has a bypass pipe 19 in which a refrigerant bypasses a second heat-exchanging unit 36 when a defrosting operation is performed.

(5-2) Detailed Structure

The refrigerant circuit 10 further has the bypass pipe 19, a first valve B1, and a second valve B2.

The bypass pipe 19 is connected to a first refrigerant pipe 16 that connects a compressor 11 and a first condenser 13a to each other and to a second refrigerant pipe 17 that connects the first condenser 13a and a second condenser 13b to each other. When a defrosting operation is performed, the refrigerant that flows in the second refrigerant pipe 17 bypasses the second heat-exchanging unit 36 and flows in the first refrigerant pipe 16 due to the bypass pipe 19.

The first valve B1 is provided at the second refrigerant pipe 17. The second valve B2 is provided at the bypass pipe 19. The first valve B1 and the second valve B2 are on-off valves.

Since a water circuit 20 and a water heat exchanger 30 are the same as those of the third embodiments, a description thereof is not repeated.

(5-3) Operation of Water Heating System (5-3-1) Heating Operation

FIG. 7 shows flows of the refrigerant and water when a heating operation of one or more embodiments is performed. A heating operation of the water heating system 4 is described with reference to FIG. 7.

At the time of the heating operation, the first valve B1 is fully open and the second valve B2 is fully closed. In the refrigerant circuit 10, since the first valve B1 is open, the refrigerant discharged from the compressor 11 flows through the first refrigerant pipe 16 and flows into the second heat-exchanging unit 36, serving as a heat radiator 12. At the second heat-exchanging unit 36, in the first condenser 13a, heat of the refrigerant discharged from the compressor 11 is radiated to water in the water circuit 20. The refrigerant whose temperature has been reduced due to the heat being radiated at the heat radiator 12 flows through the second refrigerant pipe 17 and flows into the first heat-exchanging unit 35. At the first heat-exchanging unit 35, in the second condenser 13b, heat is radiated to water in the water circuit 20 and the refrigerant is condensed. After the refrigerant condensed at the second condenser 13 has passed through a third refrigerant pipe 18 and has expanded at an expansion valve 14, the refrigerant flows into an evaporator 15.

In the water circuit 20, water of a hot water storage tank 23 flows sequentially into the second heat-exchanging unit 36 and the first heat-exchanging unit 35 by a circulation pump 21. Water in the water circuit 20 is heated by the refrigerant at the second heat-exchanging unit 36 and the first heat-exchanging unit 35. Hot water produced by the heating returns to the hot water storage tank 23.

(5-3-2) Defrosting Operation

FIG. 8 shows flows of the refrigerant and water when a defrosting operation of one or more embodiments is performed. In FIG. 8, a water inlet portion 31, a water outlet portion 32, a refrigerant inlet portion 33, and a refrigerant outlet portion 34 are each provided with a reference sign based on a direction of flow of the refrigerant and water when a heating operation is performed (the same as in FIG. 7). A defrosting operation of the water heating system 5 is described with reference to FIG. 8.

When the defrosting operation is performed, the first valve B1 is fully closed and the second valve B2 is fully open. The refrigerant discharged from the compressor 11 flows into a heat exchanger that functions as the evaporator 15 when a heating operation is performed, radiates heat to outside air, and is condensed. After the refrigerant has expanded at the expansion valve 14, the refrigerant flows through the third refrigerant pipe 18 and flows into the first heat-exchanging unit 35. Then, the refrigerant flows through a flow path that functions as a second condenser 13b when a heating operation is performed, and flows out from the first heat-exchanging unit 35. Thereafter, although the refrigerant passes through the second refrigerant pipe 17, since the first valve B1 is closed and the second valve B2 is open, the refrigerant bypasses the second heat-exchanging unit 36 and passes through the bypass pipe 19. The refrigerant passes through the first refrigerant pipe 16 that is connected to the bypass pipe 19, and is sucked into the compressor 11.

(5-4) Features

In the water heating system 5 of one or more embodiments, the refrigerant circuit 10 further has a bypass pipe 19 in which a refrigerant bypasses the second heat-exchanging unit 36 when a defrosting operation is performed. Due to the refrigerant bypassing the second heat-exchanging unit 36 at the time of a defrosting operation, it is possible to use the heat amount that has been stored by heat exchange with a high-temperature refrigerant, as a result of which it is possible to cause water to reach a predetermined temperature at an early stage at the time of a heating operation.

(5-5) Modification of Fourth Embodiments and Fifth Embodiments

Figure 9:
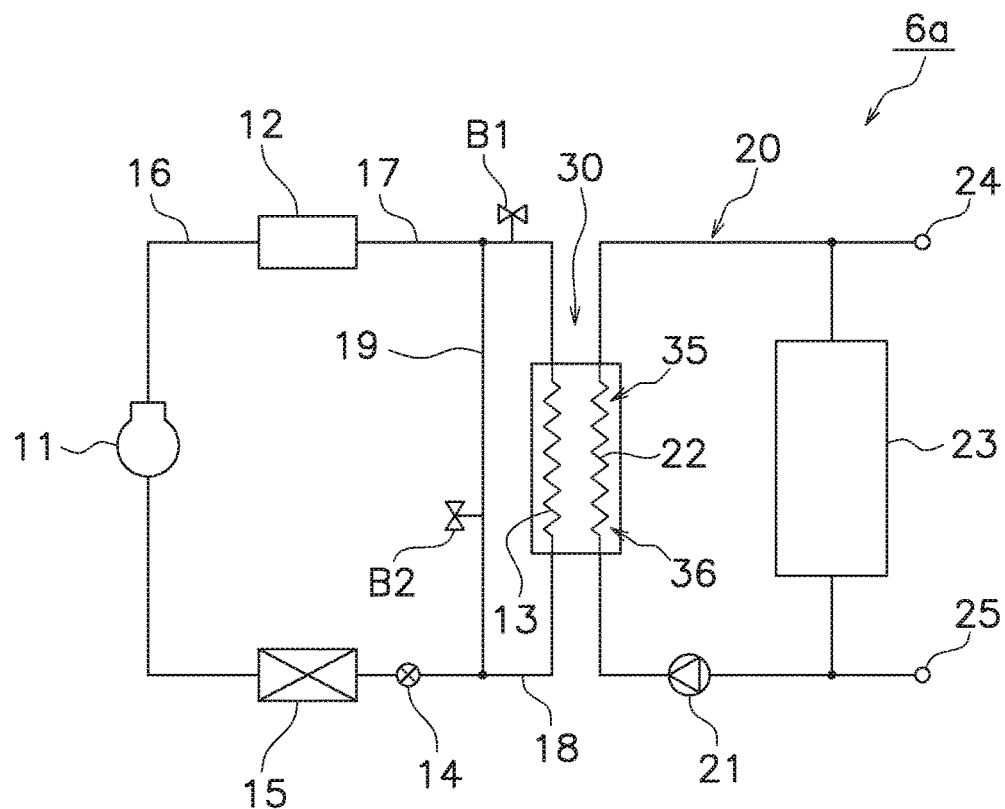
FIG. 9 is a schematic structural view of a water heating system according to a modification of the fourth embodiments and the fifth embodiments.

In the fourth embodiments, the refrigerant circuit 10 further has the bypass pipe 19 in which the refrigerant bypasses the first heat-exchanging unit 35 when a defrosting operation is performed. In the fifth embodiments, the refrigerant circuit 10 further has a bypass pipe 19 in which a refrigerant bypasses the second heat-exchanging unit 36 when a defrosting operation is performed. In the present modification, as shown in FIG. 9, the refrigerant circuit 10 further has a bypass pipe 19 in which a refrigerant bypasses the first heat-exchanging unit 35 and the second heat-exchanging unit 36 when a defrosting operation is performed.

A water heating system of the present modification has a configuration that is the same as the configuration of the water heating system of the first embodiments shown in FIG. 1, but differs in that the refrigerant circuit 10 further has a bypass pipe 19. The bypass pipe 19 of the present modification is connected to the second refrigerant pipe 17 that connects the heat radiator 12 and the condenser 13 to each other and to the third refrigerant pipe 18 that connects the condenser 13 and the expansion valve 14 to each other.

By closing the second valve B2 that is provided at the bypass pipe 19 and opening the first valve B1 that is provided at the second refrigerant pipe 17, it is possible to perform a heating operation. By opening the second valve B2 that is provided at the bypass pipe 19 and closing the first valve B1 that is provided at the second refrigerant pipe 17, it is possible to perform a defrosting operation.

(6) Sixth Embodiments (6-1) Overall Structure

Figure 10:
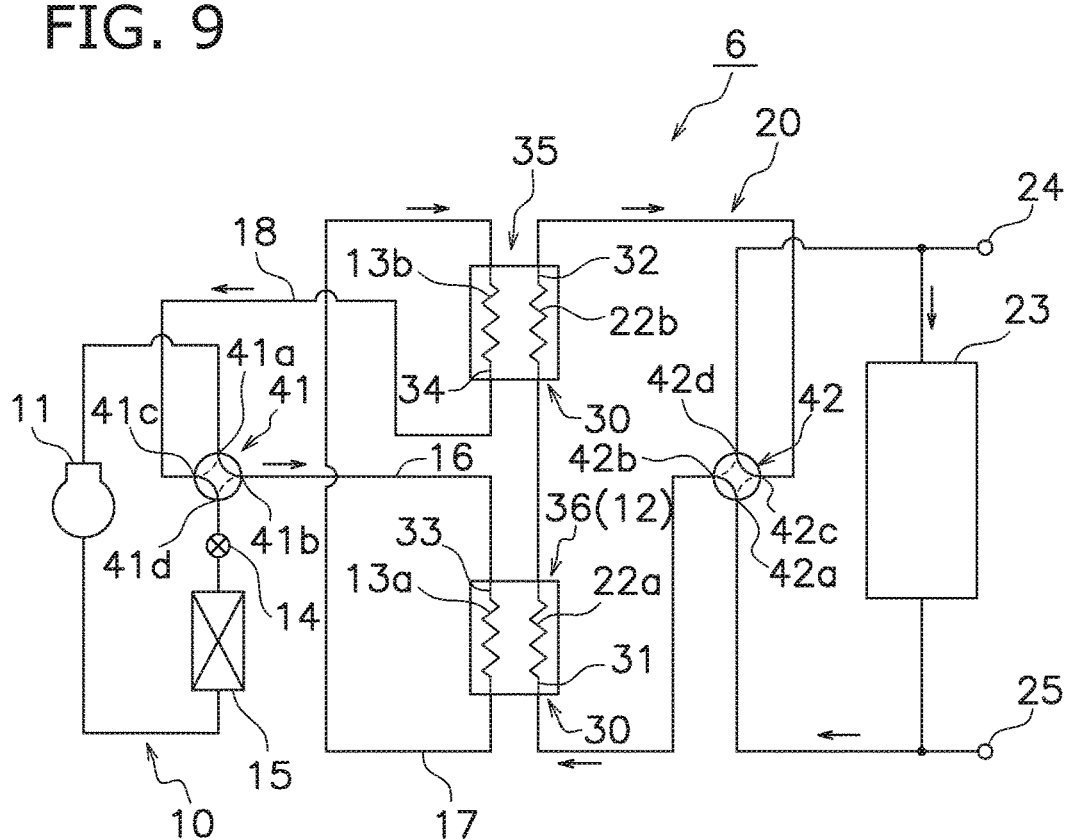
FIG. 10 is a schematic structural view of a water heating system according to sixth embodiments.
Figure 11:
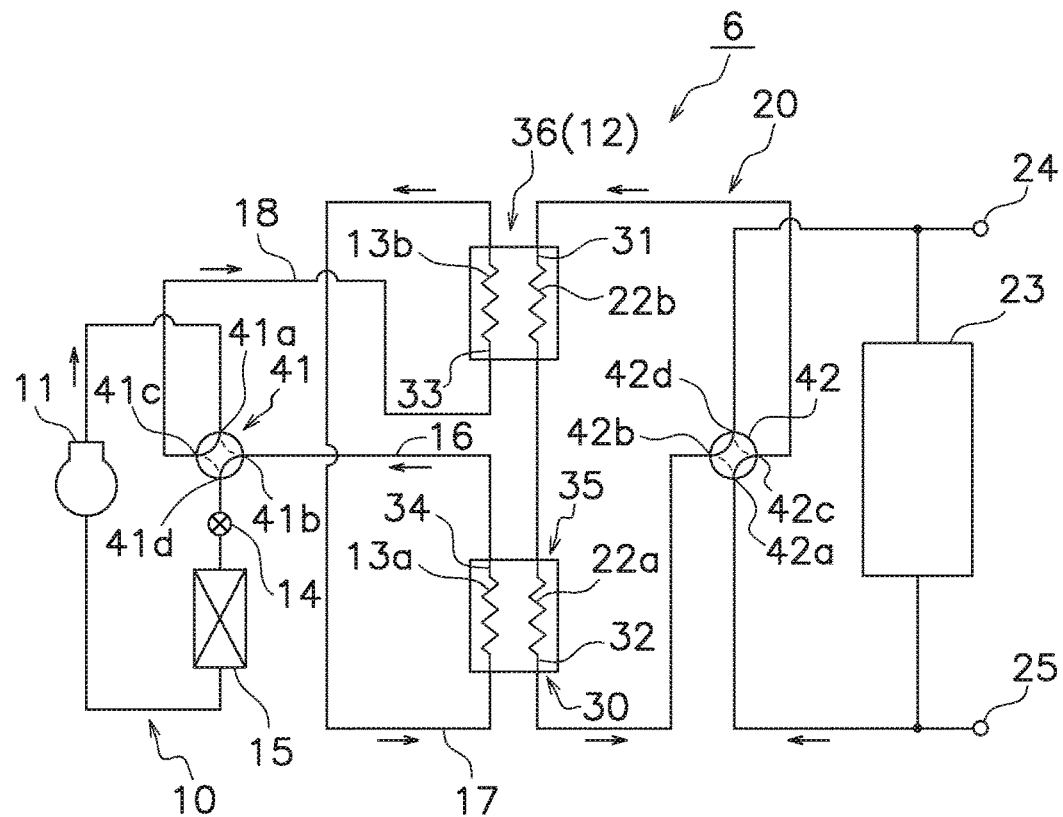
FIG. 11 is a schematic structural view of the water heating system according to the sixth embodiments.

A water heating system 6 of sixth embodiments shown in FIGS. 10 and 11 is basically the same as the water heating system 3 of the third embodiments, but differs primarily in a refrigerant circuit 10 and a water circuit 20. The water heating system 6 of one or more embodiments is configured so that at least one of the refrigerant circuit 10 and the water circuit 20 is configured to allow circulation also in a corresponding one of a reverse refrigerant flow direction and a reverse water flow direction.

(6-2) Detailed Structure (6-2-1) Refrigerant Circuit

The refrigerant circuit 10 further has a switching mechanism 41. The switching mechanism 41 is a flow-path switching mechanism that switches a flow of a refrigerant in the refrigerant circuit 10. Here, the switching mechanism 41 is a four-way switching valve. The switching mechanism 41 switches the direction of flow of the refrigerant between a first direction and a second direction that is a direction opposite to the first direction.

When the refrigerant is caused to flow in the first direction shown in FIG. 10, as indicated by a solid line of the switching mechanism 41 in FIG. 10, the switching mechanism 41 causes a first port 41*a* and a second port 41*b* to communicate with each other and causes a third port 41*c* and a fourth port 41*d* to communicate with each other. Therefore, a compressor 11 and a first condenser 13*a* are connected to each other, and a second condenser 13*b* and an expansion valve 14 are connected to each other.

When the refrigerant is caused to flow in the second direction shown in FIG. 11, as indicated by a solid line of the switching mechanism in FIG. 11, the switching mechanism 41 causes the first port 41*a* and the third port 41*c* to communicate with each other and causes the second port 41*b* and the fourth port 41*d* to communicate with each other. Therefore, the compressor 11 and the second condenser 13*b* are connected to each other, and the first condenser 13*a* and the expansion valve 14 are connected to each other.

(6-2-2) Water Circuit

The water circuit 20 further has a switching mechanism 42. The switching mechanism 42 is a flow-path switching mechanism that switches the flow of water in the water circuit 20. Here, the switching mechanism 42 is a four-way switching valve. The switching mechanism 42 switches the direction of flow of water between a first direction and a second direction that is a direction opposite to the first direction.

When the refrigerant is caused to flow in the first direction shown in FIG. 10, as indicated by a solid line of the switching mechanism 42 in FIG. 10, the switching mechanism 42 causes a first port 42*a* and a second port 42*b* to communicate with each other and causes a third port 42*c* and a fourth port 42*d* to communicate with each other. Therefore, a water supply port to a water heat exchanger 30 in a hot water tank 23 and a first heat absorber 22*a* are connected to each other, and a hot water receiving port from the water heat exchanger 30 in the hot water tank 23 and a second heat absorber 22*b* are connected to each other.

When water is to be caused to flow in the second direction shown in FIG. 11, as indicated by a solid line of the switching mechanism in FIG. 11, the switching mechanism 42 causes the first port 42*a* and the third port 42*c* to communicate with each other and causes the second port 42*b* and the fourth port 42*d* to communicate with each other. Therefore, the water supply port to the water heat exchanger 30 and the second heat absorber 22*b* are connected to each other, and the water receiving port from the water heat exchanger 30 in the hot water tank 23 and the first heat absorber 22*a* are connected to each other.

(6-2-3) Water Heat Exchanger

When the water heat exchanger 30 causes the refrigerant of the refrigerant circuit 10 and water of the water circuit 20 to circulate in a reverse direction by using a corresponding one of the switching mechanisms 41 and 42, the first heat-exchanging unit 35 and the second heat-exchanging unit 36 are reversed.

When the refrigerant and water circulate in the first direction shown in FIG. 10, a water heat exchanger on an upper side in FIG. 10 constitutes the first heat-exchanging unit 35, and a water heat exchanger on a lower side in FIG. 10 constitutes the second heat-exchanging unit 36. When the refrigerant and water circulate in the second direction shown in FIG. 11, a water heat exchanger on a lower side in FIG. 11 constitutes the first heat-exchanging unit 35, and a water heat exchanger on an upper side in FIG. 11 constitutes the second heat-exchanging unit 36.

(6-3) Operation of Water Heating System

The water heating system 6 of one or more embodiments is capable of performing a first heating operation in which the refrigerant and water flow in the first direction and a second heating operation in which the refrigerant and water flow in the second direction. The first heating operation and the second heating operation can be selected as appropriate. Here, the first heating operation and the second heating operation are alternately switched at a predetermined operation time.

(6-3-1) First Heating Operation

FIG. 10 illustrates flows of the refrigerant and water in the first direction of one or more embodiments. With reference to FIG. 10, a heating operation of the water heating system 6 when the refrigerant and water flow in the first direction is described.

In the refrigerant circuit 10, when the switching mechanism 41 is switched as shown in FIG. 10, the refrigerant discharged from the compressor 11 flows through the second port 41a from the first port 41b and flows into the second heat-exchanging unit 36, serving as a heat radiator 12. At the second heat-exchanging unit 36, in the first condenser 13a, heat of the refrigerant discharged from the compressor 11 is radiated to water in the water circuit 20. The refrigerant whose temperature has been reduced due to the heat being radiated at the heat radiator 12 flows into the first heat-exchanging unit 35 via a second refrigerant pipe 17. At the first heat-exchanging unit 35, in the second condenser 13b, heat is radiated to water in the water circuit 20 and the refrigerant is condensed. After the refrigerant condensed at the second condenser 13b has passed through the fourth port 41d from the third port 41c and has expanded at the expansion valve 14, the refrigerant flows into the evaporator 15.

In the water circuit 20, when the switching mechanism 42 is switched as shown in FIG. 10, water of the hot water storage tank 23 passes through the second port 42b from the first port 42a and flows into the second heat-exchanging unit 36. At the second heat-exchanging unit 36, in the first heat absorber 22a, water in the water circuit 20 is heated by the heat radiator 12 due to heat being absorbed from the refrigerant. The water that has been heated at the heat radiator 12 flows into the first heat-exchanging unit 35 and further absorbs heat from the refrigerant at the second heat absorber 22b, as a result of which the water is heated. Hot water produced by the heating returns to the hot water storage tank 23 via the fourth port 42d from the third port 42c.

(6-3-2) Second Heating Operation

FIG. 11 illustrates flows of the refrigerant and water in the second direction of one or more embodiments. A heating operation of the water heating system 6 when the refrigerant and water flow in the second direction is described with reference to FIG. 11.

When the switching mechanism 42 is switched as shown in FIG. 11, in the refrigerant circuit 10, the refrigerant discharged from the compressor 11 flows through the third port 41c from the first port 41a and flows into the second heat-exchanging unit 36, serving as the heat radiator 12. At the second heat-exchanging unit 36, in the second condenser 13b, heat of the refrigerant discharged from the compressor 11 is radiated to water in the water circuit 20. The refrigerant whose temperature has been reduced due to the heat being radiated at the heat radiator 12 flows into the first heat-exchanging unit 35 via a second refrigerant pipe 17. At the first heat-exchanging unit 35, in the first condenser 13a, heat is radiated to water in the water circuit 20 and the refrigerant is condensed. After the refrigerant condensed at the first condenser 13a has passed through the fourth port 41d from the second port 41b and has expanded at the expansion valve 14, the refrigerant flows into the evaporator 15.

When the switching mechanism 42 is switched as shown in FIG. 11, in the water circuit 20, water of the hot water storage tank 23 passes through the third port 42c from the first port 42a and flows into the second heat-exchanging unit 36. At the second heat-exchanging unit 36, in the second heat absorber 22b, water in the water circuit 20 is heated by the heat radiator 12 due to heat being absorbed from the refrigerant. The water that has been heated at the heat radiator 12 flows into the first heat-exchanging unit 35 and further absorbs heat from the refrigerant at the first heat absorber 22a, as a result of which the water is heated. Hot water produced by the heating returns to the hot water storage tank 23 via the fourth port 42d from the second port 42b.

(6-4) Features

In the water heating system 6 of one or more embodiments, the refrigerant circuit 10 and the water circuit 20 are configured to allow circulation also in a corresponding one of the reverse refrigerant flow direction and the reverse water flow direction. Even if scale adheres, the scale can be dispersed due to the circulation in a reverse direction, as a result of which the life of the water heat exchanger 30 can be increased.

(6-5) Modification of Sixth Embodiments

(6-5-1) Modification 1

In the embodiments above, both of the refrigerant circuit 10 and the water circuit 20 are configured to allow circulation also in a corresponding one of the reverse refrigerant flow direction and the reverse water flow direction. In the present modification, although the refrigerant circuit 10 is configured to cause a refrigerant to also circulate in a reverse direction, the water circuit 20 is configured to cause the water flow direction to be constant. Alternatively, while the water circuit 20 may be configured to allow circulation also in the reverse water flow direction, the refrigerant circuit 10 may be configured to cause the refrigerant flow direction to be constant.

(6-5-2) Modification 2

Although in the embodiments above, the switching mechanism 41 of the refrigerant circuit 10 and the switching mechanism 42 of the water circuit 20 are each a four-way switching valve, they are not limited thereto. The switching mechanism 42 of the water circuit 20 of the present modification is a two-way switching valve or a reverse circulation pump.

(7) Seventh Embodiments

(7-1) Overall Structure

Figure 12:
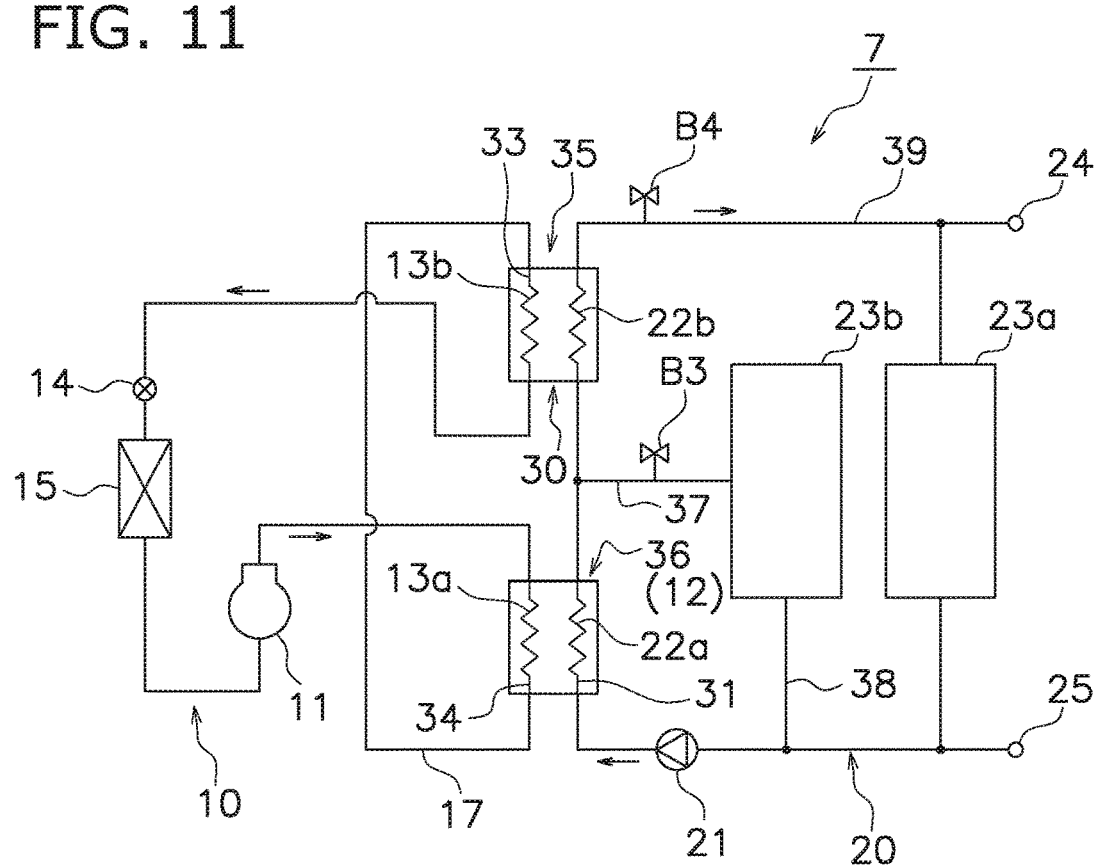
FIG. 12 is a schematic structural view of a water heating system according to seventh embodiments.

A water heating system 7 of seventh embodiments shown in FIG. 12 is basically the same as the water heating system 3 of the third embodiments, but differs primarily in a water circuit 20. In the water heating system 7 of one or more embodiments, the water circuit 20 further has a take-out portion 37 that takes out water from between a water inlet portion 31 and a water outlet portion 32 of a water heat exchanger 30.

(7-2) Detailed Structure

The water circuit 20 further has the take-out portion 37, a third valve B3, a fourth valve B4, and an intermediate-temperature water tank 23b. The hot water tank 23 of the third embodiments shown in FIG. 3 corresponds to a high-temperature water tank 23a of one or more embodiments shown in FIG. 12.

The intermediate-temperature water tank 23b stores water having a temperature that is lower than the temperature of water that is stored in the high-temperature water tank 23a.

The take-out portion 37 of one or more embodiments is a pipe that branches off from between a first heat absorber 22a and a second heat absorber 22b and that is connected to a receiving port of the intermediate-temperature water tank 23b in the water circuit 20.

The intermediate-temperature water tank 23b receives intermediate-temperature water from the take-out portion 37. Here, the intermediate-temperature water tank 23b is connected to a first water pipe 38 that supplies water to the water heat exchanger 30. Therefore, the water circuit 20 has a first water circuit in the high-temperature water tank 23a and a second water circuit in the intermediate-temperature water tank 23b. Note that the water circuit 20 may not have a first water pipe 38, and the intermediate-temperature water tank 23b may be constituted by a first water circuit that only receives intermediate-temperature water.

The third valve B3 is provided at the take-out portion 37. The fourth valve B4 is provided at a water pipe 39 that connects the second heat absorber 22b and the high-temperature water tank 23a to each other. The third valve B3 and the fourth valve B4 are on-off valves.

Note that the water circuit 20 may further have a water pipe (not shown) that sends high-temperature water to intermediate-temperature water.

Since a refrigerant circuit 10 and the water heat exchanger 30 are the same as those of the third embodiments, the description thereof is not repeated.

(7-3) Operation of Water Heating System

First, a heating operation of taking out intermediate-temperature water and high-temperature water by opening the third valve B3 and the fourth valve B4 is described.

In the water circuit 20, water at the high-temperature water tank 23a and water at the intermediate-temperature water tank 23b flow into a second heat-exchanging unit 36 by a circulation pump 21. At the second heat-exchanging unit 36, in the first heat absorber 22a, water in the water circuit 20 is heated by a heat radiator 12 due to heat being absorbed from a refrigerant.

A part of the water that has been heated at the heat radiator 12 flows into the first heat-exchanging unit 35 and further absorbs heat from the refrigerant at the second heat absorber 22b, as a result of which the water is heated. High-temperature water produced by the heating flows into the high-temperature water tank 23a.

The remaining water that has been heated at the heat radiator 12 flows as intermediate-temperature water into the intermediate-temperature water tank 23b via the take-out portion 37.

In this way, the water heating system 7 of one or more embodiments is capable of performing a heating operation that takes out intermediate-temperature water and high-temperature water. The ratio between the production of intermediate-temperature water and the production of high-temperature water can be arbitrarily changed by adjusting the opening degree of the third valve B3 and the opening degree of the fourth valve B4.

When the third valve B3 is closed and the fourth valve B4 is opened, a heating operation that takes out only high-temperature water is possible as in the third embodiments. When the third valve is opened and the fourth valve is closed, a heating operation that takes out only intermediate-temperature water is possible.

(7-4) Features

In the water heating system 7 of one or more embodiments, the water circuit 20 further has a take-out portion 37 that takes out water from between the water inlet portion 31 and the water outlet portion 32 of the water heat exchanger 30. Therefore, it is possible to take out high-temperature water at the water outlet portion 32 and intermediate-temperature water between the water outlet portion 32 and the water inlet portion 31, the high-temperature water and the intermediate-temperature water being heated by the refrigerant in the water heat exchanger 30.

(8) Eighth Embodiments (8-1) Overall Structure

In the water heating systems 1 to 7 of the first to seventh embodiments described above, in the water heat exchanger 30, the water flow direction and the refrigerant flow direction are in a counter-flow relationship. In a water heating system 8 of one or more embodiments shown in FIG. 13, in at least a part of a water heat exchanger 30, the water flow direction and the refrigerant flow direction are in a parallel-flow relationship.

(8-2) Detailed Structure

A refrigerant circuit 10 of one or more embodiments is basically the same as the refrigerant circuit 10 of the water heating system 3a shown in FIG. 4, but differs in that a refrigerant outlet is positioned at one end of the water heat exchanger 30 (an upper end in FIG. 12).

Figure 13:
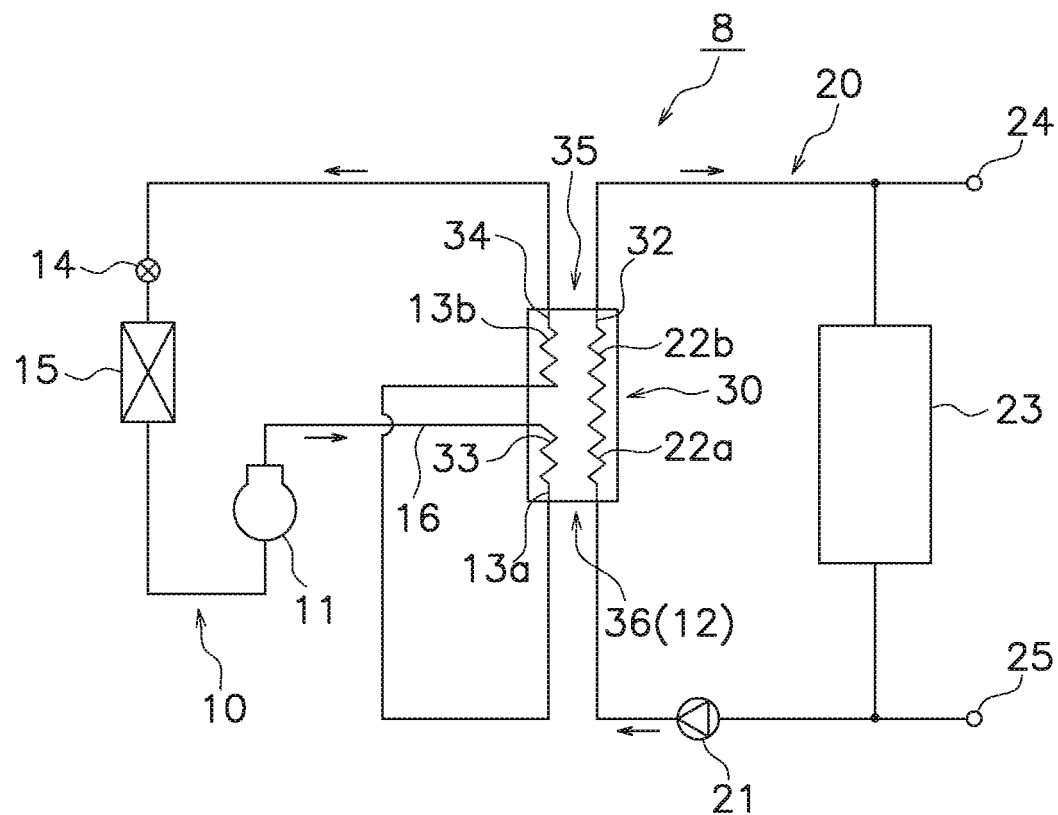
FIG. 13 is a schematic structural view of a water heating system according to eighth embodiments.

In a first heat-exchanging unit 35, in FIG. 13, a refrigerant flows upward and water flows upward. Therefore, in the first heat-exchanging unit 35, water and the refrigerant exchange heat in a parallel flow.

In a second heat-exchanging unit 36, in FIG. 12, the refrigerant flows downward and water flows upward. Therefore, in the second heat-exchanging unit 36, water and the refrigerant exchange heat with each other in a counter-flow.

In the water heating system 8 of one or more embodiments, in at least a part of the water heat exchanger 30, the water flow direction and the refrigerant flow direction are in a parallel flow relationship. Here, in a part of the water heat exchanger 30, the water flow direction and the refrigerant flow direction are in a parallel flow relationship. In this way, the water heat exchanger 30 can be configured so that the water heating system 8 causes the refrigerant and water to exchange heat with each other in a counter-flow and/or a parallel flow.

(9) Ninth Embodiments (9-1) Overall Structure

Figure 14:
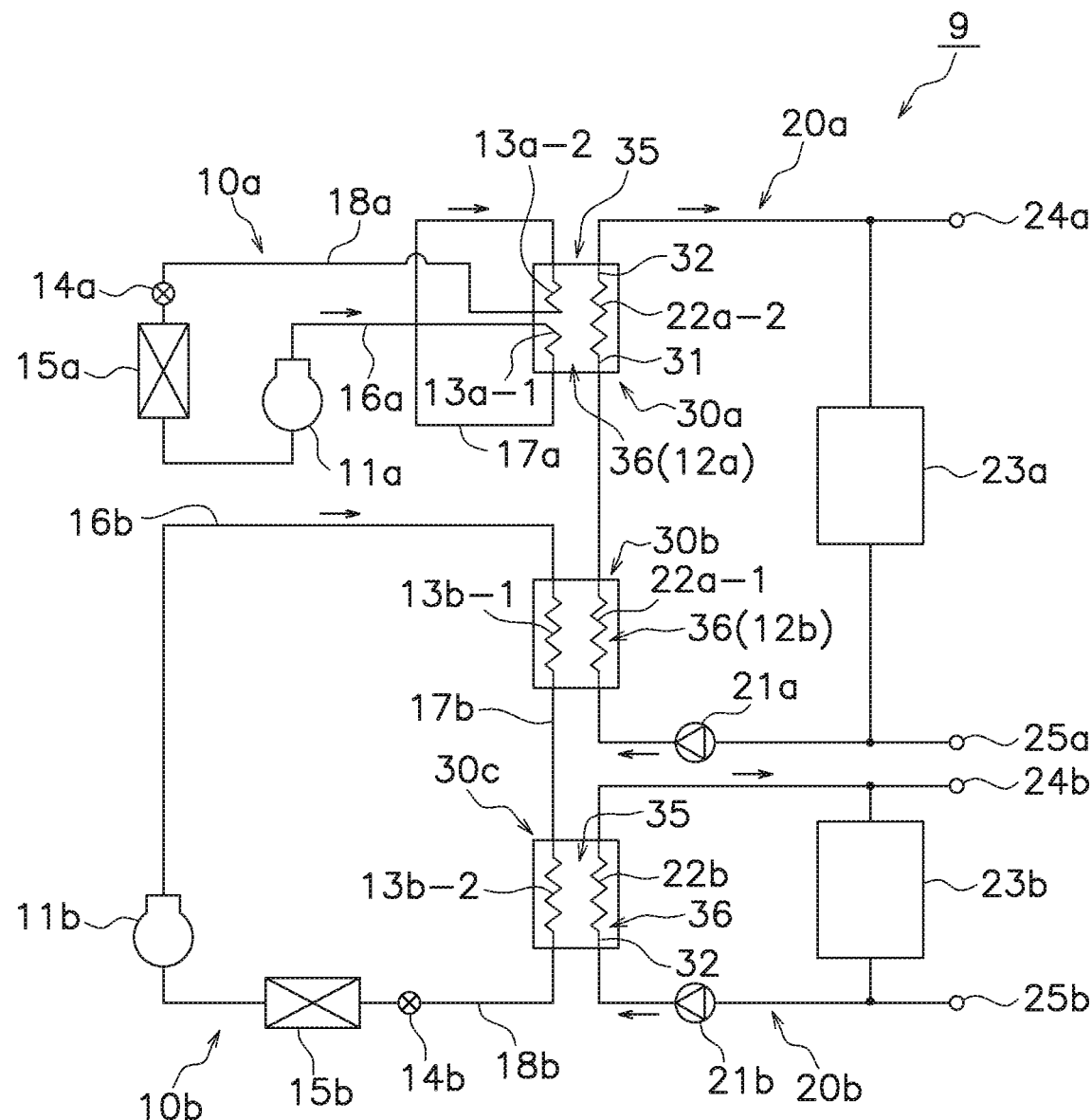
FIG. 14 is a schematic structural view of a water heating system according to ninth embodiments.

A water heating system 9 of ninth embodiments shown in FIG. 14 includes a plurality of refrigerant circuits 10a and 10b and a plurality of water circuits 20a and 20b. The refrigerant circuit 10a and the water circuit 20a share a water heat exchanger 30a. The refrigerant circuit 10b and the water circuit 20a share a water heat exchanger 30b. The refrigerant circuit 10b and the water circuit 20b share a water heat exchanger 30c.

(9-2) Detailed Structure (9-2-1) Refrigerant Circuit

The refrigerant circuit 10a shown on an upper side of FIG. 14 is the same as the refrigerant circuit 10 of the modification of the third embodiments shown in FIG. 4. To be specific, in the refrigerant circuit 10, a compressor 11a, a first condenser 13a-1 serving as a heat-radiator 12a, a second condenser 13a-2, an expansion valve 14a, and an evaporator 15a are sequentially connected to each other by a refrigerant pipe.

The refrigerant circuit 10b shown on a lower side in FIG. 14 includes a compressor 11b, a first condenser 13b-1 serving as a heat radiator 12b, a second condenser 13b-2, an expansion valve 14b, and an evaporator 15b. In the refrigerant circuit 10b, the compressor 11b, the first condenser 13b-1 serving as the heat radiator 12b, the second condenser 13b-2, the expansion valve 14b, and the evaporator 15b are sequentially connected to each other by a refrigerant pipe.

(9-2-2) Water Circuit

The water circuit 20a shown on the upper side of FIG. 14 is the same as the water circuit 20 of the third embodiments shown in FIG. 3. To be specific, in the water circuit 20a, a circulation pump 21, a first heat absorber 22a-1, a second heat absorber 22a-2, and a hot water storage tank 23a are sequentially connected to each other by a water pipe. The hot water storage tank 23a stores high-temperature water.

The water circuit 20b shown on the lower side of FIG. 14 is the same as the water circuit 20 of the first embodiments shown in FIG. 1. To be specific, in the water circuit 20b, a circulation pump 21, a heat absorber 22b, and a hot water storage tank 23b are sequentially connected to each other by a water pipe. The hot water storage tank 23b stores intermediate-temperature water.

(9-2-3) Water Heat Exchanger

The water heat exchanger 30a on the upper side of FIG. 14 constitutes the first heat-exchanging unit 35 in relation to the water heat exchanger 30b at the center. When the water heat exchanger 30a is seen as a single water heat exchanger, the water heat exchanger 30a includes the first heat-exchanging unit 35 in which the second condenser 13a-2 and a water outlet portion 32 exchange heat with each other and the second heat-exchanging unit 36 in which the first condenser 13a-1 and a water inlet portion 31 exchange heat with each other.

The water heat exchanger 30b at the center of FIG. 14 constitutes the second heat-exchanging unit 36 in relation to the water heat exchanger 30a. Further, in relation to the water heat exchanger 30c on the lower side of FIG. 14, the water heat exchanger 30b constitutes the second heat-exchanging unit 36.

The water heat exchanger 30c on the lower side of FIG. 14 constitutes the first heat-exchanging unit 35 in relation to the water heat exchanger 30b.

(9-3) Operation of Water Heating System

At the refrigerant circuit 10a, a refrigerant discharged from the compressor 11a flows into the second heat-exchanging unit 36 of the water heat exchanger 30a, serving as the heat radiator 12a, via a first refrigerant pipe 16a. At the second heat-exchanging unit 36 of the water heat exchanger 30a, in the first condenser 13a-1, serving as the heat radiator 12a, heat of the refrigerant discharged from the compressor 11a is radiated to water in the water circuit 20a. The refrigerant whose temperature has been reduced due to heat being radiated at the heat radiator 12a flows into the first heat-exchanging unit 35 of the water heat exchanger 30a via a second refrigerant pipe 17a. At the first heat-exchanging unit 35, in the second condenser 13a-2, heat is radiated to water at the water circuit 20a and the refrigerant is condensed. After the refrigerant condensed at the first and second condensers 13a has expanded at the expansion valve 14, the refrigerant flows into the evaporator 15 via the third refrigerant pipe 18a.

At the refrigerant circuit 10b, the refrigerant discharged from the compressor 11b flows into the water heat exchanger 30b, serving as the heat radiator 12b, via a first refrigerant pipe 16b. The water heat exchanger 30b is the second heat-exchanging unit 36, and, at the first condenser 13b-1 of the water heat exchanger 30b, heat of the refrigerant discharged from the compressor 11a is radiated to water in the water circuit 20a. The refrigerant whose temperature has been reduced due to heat being radiated at the heat radiator 12b flows into the water heat exchanger 30c via a second refrigerant pipe 17b. The water heat exchanger 30c is the first heat-exchanging unit 35, and, at the second condenser 13b-2 of the water heat exchanger 30c, heat is radiated to water in the water circuit 20b and the refrigerant is condensed. After the refrigerant that has been condensed at the first and second condensers 13b has expanded at the expansion valve 14b, the refrigerant flows into the evaporator 15b via a third refrigerant pipe 18b.

In the water circuit 20a, water in the hot water storage tank 23a flows into the water heat exchanger 30b by a circulation pump 21a. The water heat exchanger 30b is the second heat-exchanging unit 36, and in the first heat absorber 22a-1, water in the water circuit 20a is heated by the heat radiator 12b due to heat being absorbed from the refrigerant. The water heated at the heat radiator 12b flows into the water heat exchanger 30a. At the water heat exchanger 30a, water is heated by further absorbing heat from the refrigerant at the second heat-exchanging unit 36 and the second heat absorber 22a-2 of the first heat-exchanging unit 35. The high-temperature water produced by the heating returns to the hot water storage tank 23.

In the water circuit 20b, water in the hot water storage tank 23b flows into the second heat-exchanging unit 36 of the water heat exchanger 30c by a circulation pump 21b. At the first heat-exchanging unit 35 of the water heat exchanger 30c, water in the water circuit 20b is heated by absorbing heat from the refrigerant that has radiated heat at the water heat exchanger 30b, serving as the heat radiator 12b. The intermediate-temperature water produced by the heating returns to the hot water storage tank 23.

(9-4) Features

The water heating system 9 of one or more embodiments includes a plurality of evaporators 15. Here, each evaporator 15 is an outdoor unit. In this way, the water heating system 9 of the present disclosure can also be applied to a system including a plurality of outdoor units.

Although the disclosure has been described with respect to only a limited number of embodiments, those skilled in the art, having benefit of this disclosure, will appreciate that various other embodiments may be devised without departing from the scope of the present disclosure. Accordingly, the scope of the disclosure should be limited only by the attached claims.

REFERENCE SIGNS LIST 1, 2, 3, 3a, 4, 5, 6, 6a, 7, 8, 9 water heating system
10, 10a, 10b refrigerant circuit
11 compressor
12 heat radiator
13 condenser
14 expansion valve
15 evaporator
19 bypass pipe
20, 20a, 20b water circuit
21 circulation pump
22 heat absorber
23 tank
30, 30a, 30b water heat exchanger
31 water inlet portion
32 water outlet portion
33 refrigerant inlet portion
34 refrigerant outlet portion 35 first heat-exchanging unit
36 second heat-exchanging unit
37 take-out portion
41, 42 switching mechanism

PATENT LITERATURE

PTL 1: Japanese Unexamined Patent Application Publication No. 2015-17761

What is claimed is:

1. A water heating system comprising:
a refrigerant circuit that comprises a compressor and in which a refrigerant flows; and
a water circuit in which water flows, wherein
the refrigerant circuit shares with the water circuit a water heat exchanger that heats the water using the refrigerant discharged from the compressor,
the water heat exchanger comprises a heat-exchanging unit in which the refrigerant exchanges heat with the water at a water outlet portion, and
the refrigerant circuit further comprises a heat radiator that is disposed between the compressor and the heat-exchanging unit and that radiates heat of the refrigerant discharged from the compressor, to water that flows on an upstream side of the water outlet portion.

2. The water heating system according to claim 1, wherein the water heat exchanger further comprises the heat radiator.

3. The water heating system according to claim 2, wherein the refrigerant circuit further comprises a bypass pipe in which the refrigerant bypasses one of the heat-exchanging unit and the heat radiator when a defrosting operation is performed.

4. The water heating system according to claim 1, wherein, in one or both of the heat-exchanging unit and the heat radiator, a water flow direction and a refrigerant flow direction are in a counter-flow relationship.

5. The water heating system according to claim 1, wherein at least one of the refrigerant circuit and the water circuit is configured to circulate a corresponding one of the refrigerant and water in a reverse flow direction.

6. The water heating system according to claim 1, wherein the water circuit further comprises a take-out portion that takes out water from between a water inlet portion and the water outlet portion.

7. The water heating system according to claim 1, wherein the heat radiator is disposed upstream of the heat-exchanging unit with respect to a flow direction of the refrigerant.

* * * * *